Patented July 15, 1947

2,423,883

UNITED STATES PATENT OFFICE 2,423,883

PRODUCTION OF CELLULOSE DERIVATIVES

James Wotherspoon Fisher, Spondon, near Derby, England, assignor to British Celanese Limited, London, England, a company of Great Britain No Drawing. Application October 11, 1944, Serial No. 558,289. In Great Britain November 5, 1943

9 Claims. (Cl. 260—226)

This invention is concerned with improvements in or relating to the production of cellulose derivatives, and particularly to the production of ether-esters of cellulose.

According to the present invention ether-esters of cellulose containing the radicles of organic carboxylic acids comprising at least six carbon atoms are produced by esterifying cellulose ethers, particularly alkyl ethers containing at least two alkyl radicles per $C_6H_{10}O_5$ unit of cellulose, with anhydrides of the appropriate acids in the presence of metal halides as catalysts. Examples of suitable metal halides are ferric and stannic chlorides and particularly zinc chloride. Preferably they are used in small proportions based on the weight of the cellulose ether and in conjunction with small proportions of a hydro-halide acid, particularly hydrochloric acid. Proportions of metal halide and of acid of from .25 to 1% of the weight of the ether are preferred.

The invention is particularly concerned with the production of cellulose ether-esters which have a low moisture regain and the use of metal halides as catalysts is of particular value in this connection. In order to obtain a low moisture regain it is desirable that cellulose ether-esters should be substantially free from hydroxy groups, the average value of the sum of the ether and ester radicles in each $C_6H_{10}O_5$ unit of cellulose being at least 2.5 and preferably 2.7 or 2.8 or more. In order to obtain such a degree of substitution the choice of esterification conditions is important, since if it is necessary to use vigorous conditions in order to obtain the required degree of esterification there is a risk that degradation may itself make it substantially impossible to obtain the desired properties. Sulphuric acid, which is the normal esterification catalyst, and derivatives thereof, for example sulphuryl chloride and sulphonic acids, are undesirable for use as catalysts since they are liable to introduce into the cellulose derivatives sulphur-containing residues which affect the stability of the derivatives. Metal halides, especially ferric, stannic and zinc chlorides, particularly when used in conjunction with hydrochloric acid, have been found to be very valuable catalysts for the esterification of cellulose ethers since they render it possible to obtain substantially complete esterification of the free hydroxy groups without causing an undue amount of degradation, so that products having a low moisture regain may be obtained.

Preferably an esterification medium is employed in which both the ether-ester produced, as well as the original cellulose ether, are soluble. Halogenated hydrocarbons, particularly ethylene dichloride, have been found very suitable as inert solvents when the cellulose ether to be esterified is a hydrophobe ethyl cellulose, containing, for example, 2.4 to 2.6 ethyl radicles for $C_6H_{10}O_5$ unit, or other cellulose ether which is soluble in the halogenated hydrocarbon. Pyridine is another solvent which may be employed in the esterification of such hydrophobe ethers.

An important advantage of the present invention is that the reaction with the anhydride is almost quantitative, the excess of anhydride required over the amount theoretically necessary being usually only about 5–10%.

The cellulose ether-esters with which the invention is particularly concerned are those obtained by the esterification of ethyl celluloses and other alkyl celluloses which are soluble in hydrophobe organic solvents, for example mixtures of toluene and butyl alcohol, particularly ethyl celluloses containing 2.3–2.8 ethoxy radicles per $C_6H_{10}O_5$ unit. Examples of other alkyl celluloses which may be esterified are propyl, butyl and hexyl celluloses. As has already been stated the anhydrides employed are anhydrides of organic carboxylic acids containing at least six carbon atoms. Preferably they are anhydrides of fatty mono-carboxylic acids containing 12 or more carbon atoms in the molecule, for example lauric, palmitic and stearic anhydrides, though anhydrides of other carboxylic acids may be employed, for example the anhydrides of caproic, heptylic and other aliphatic acids and of benzoic and other aromatic acids.

The following example is given to illustrate the invention:

200 parts by weight of an ethyl cellulose having an ethoxy content of about 48% and soluble in a mixture of toluene and butyl alcohol is dissolved in 1250 parts of ethylene dichloride. When solution is complete, 150 parts of stearic anhydride are introduced together with 0.5 part of zinc chloride and 0.5 part of hydrochloric acid. The reaction mixture is maintained at a temperature of 50° C. for about 2 hours after which it is poured into boiling water to flash off the ethylene dichloride and the mixture of ether-ester and stearic acid is then washed repeatedly with an aqueous sodium carbonate solution containing from 0.2 to 0.5% of sodium carbonate at a temperature of about 80° C. until all the stearic acid is neutralised and removed. The ether-ester can then be separated from the washing liquid and dried.

Instead of separating the ester-ether by pouring the reaction mixture into boiling water as described above, its separation may be effected by pouring the mixture into warm water and blowing steam through it until the ethylene dichloride has been vaporised. The product, which contains stearic acid as well as the ethyl cellulose stearate, forms a liquid or semi-plastic mass which is washed with 70% aqueous ethyl alcohol at about 60–70° C. with vigorous stirring. When the washings are no longer acid the plastic mass is cooled and as much of the liquid as possible removed, for example by pressure. The mass is then dissolved in acetone and the solution poured into cold water whereupon a semi-fibrous precipitate is obtained which is separated and dried at about 30° C. Further purification of the precipitate, if necessary, can be effected by washing with a dilute solution of sodium carbonate or other alkali to remove residual stearic acid in the form of its salt. The mass can then be further washed with hot water and dried.

An important property of the cellulose ether-esters such as are obtained according to the previous example is the large number and variety of organic liquids in which they are soluble. For example, an ethyl cellulose stearate can be obtained according to the example which is soluble in methyl ethyl ketone, acetone, methyl and ethyl acetates, benzene, toluene, xylene, chloroform, methylene and ethylene dichlorides, butyl alcohol and diethyl ether. Its moisture-regain is only about 5% of that of commercial cellulose acetate and less than 20% of that of the original ethyl cellulose.

The cellulose derivatives obtained by the process of the present invention may be used in the form of solutions or plastic compositions for numerous purposes, particularly purposes for which a good water-resistance and low moisture-regain is important. For instance, they may be employed for the insulation of electric wires, cables, condensers and other electrical apparatus, for water-proofing fabrics or wrapping foils or as basic materials for filaments, foils and other articles.

Having described my invention, what I desire to secure by Letters Patent is:

1. Process for the production of cellulose derivatives, which comprises esterifying cellulose ethers at temperatures up to 50° C. with anhydrides of organic carboxylic acids containing at least six carbon atoms in the molecule in the presence of metal halides and a hydrogen halide as catalysts.

2. Process according to claim 1, wherein a cellulose ether containing at least two alkyl radicles per $C_6H_{10}O_5$ unit of cellulose is esterified.

3. Process for the production of cellulose derivatives, which comprises esterifying cellulose ethers at a temperature up to 50° C. with anhydrides of organic carboxylic acids containing at least 6 carbon atoms in the molecule in the presence of a hydrogen halide and of a metal halide catalyst, selected from the group consisting of stannic, zinc and ferric halides, in a proportion of from 0.25 to 1% of the weight of the cellulose ether.

4. Process for the production of cellulose derivatives, which comprises esterifying at a temperature of 50° C. a cellulose ether containing at least 2 alkyl radicles per $C_6H_{10}O_5$ unit of cellulose with an anhydride of an organic carboxylic acid containing at least 6 carbon atoms in the molecule in the presence of a catalyst consisting of a mixture of a hydrohalide acid and a metal halide selected from the group consisting of stannic, zinc and ferric halides, the said acid and said halide being each present in a proportion of from 0.25 to 1% of the weight of the cellulose ether.

5. Process for the production of cellulose derivatives, which comprises esterifying at a temperature of 50° C. a cellulose ether containing at least 2 alkyl radicles per $C_6H_{10}O_5$ unit of cellulose in a medium which is a solvent for the cellulose ether and for the ether-ester produced, with an anhydride of a fatty acid containing at least 6 carbon atoms in the molecule in the presence of a catalyst consisting of a mixture of hydrochloric acid and a metal chloride selected from the group consisting of stannic, zinc and ferric chlorides, the said acid and said chloride being each employed in a proportion of from 0.25 to 1% of the weight of the cellulose ether.

6. Process for the production of cellulose derivatives, which comprises esterifying at a temperature of 50° C. a cellulose ether containing at least 2 alkyl radicles per $C_6H_{10}O_5$ unit of cellulose, in a medium which is a solvent for the cellulose ether and for the ether-ester produced, with an anhydride of a fatty monocarboxylic acid containing at least 12 carbon atoms in the molecule in the presence of a catalyst consisting of a mixture of hydrochloric acid and a metal chloride selected from the group consisting of stannic, zinc and ferric chlorides, the said acid and said chloride being each present in a proportion of from 0.25 to 1% of the weight of the cellulose ether.

7. Process for the production of cellulose derivatives, which comprises esterifying at a temperature of 50° C. an ethyl cellulose containing at least 2 ethyl radicles per $C_6H_{10}O_5$ unit of cellulose, in a medium which is a solvent for the ethyl cellulose and for the ether-ester produced, with an anhydride of a fatty acid containing at least 6 carbon atoms in the molecule in an amount not exceeding 110% of that theoretically required to effect the desired degree of esterification and in the presence of a catalyst consisting of a mixture of hydrochloric acid and a metal chloride selected from the group consisting of stannic, zinc and ferric chlorides, the said acid and said chloride being each present in a proportion of from 0.25 to 1% of the weight of the ethyl cellulose.

8. Process for the production of cellulose derivatives, which comprises esterifying at a temperature of 50° C. ethyl cellulose containing at least 2 ethyl radicles per $C_6H_{10}O_5$ unit of cellulose, in a medium which is a solvent for the ethyl cellulose and for the ether-ester produced, with an anhydride of a fatty monocarboxylic acid containing at least 12 carbon atoms in the molecule in an amount not exceeding 110% of that theoretically required to effect the desired degree of esterification, in the presence of a catalyst consisting of a mixture of hydrochloric acid and a metal chloride selected from the group consisting of stannic, zinc and ferric chlorides, the said acid and said chloride being each employed in a proportion of from 0.25 to 1% of the weight of the ethyl cellulose.

9. Process for the production of cellulose derivatives, which comprises esterifying at a temperature of 50° C. ethyl cellulose containing at least 2 ethyl radicles per $C_6H_{10}O_5$ unit of cellulose, in a medium which is a solvent for the ethyl cellulose and for the ether-ester produced, with stearic anhydride in amount not exceeding 110% of that theoretically required to effect the desired degree of esterification, in the presence of a catalyst consisting of a mixture of hydrochloric acid and a metal chloride selected from the group consisting of stannic, zinc and ferric chlorides, the said acid and said chloride being each employed in a proportion of from 0.25 to 1% of the weight of the ethyl cellulose.

JAMES WOTHERSPOON FISHER.

REFERENCES CITED

The following references are of record in the file of this patent:

UNITED STATES PATENTS

| Number | Name | Date |
|---|---|---|
| 2,035,820 | Dreyfus | Mar. 10, 1936 |

FOREIGN PATENTS

| Number | Country | Date |
|---|---|---|
| 300,942 | Great Britain | Feb. 13, 1928 |

OTHER REFERENCES

"Cellulose Chemistry," Heuser, 1944, pages 237–238. (John Wiley & Sons Inc.)